United States Patent
Wallace

(10) Patent No.: US 11,420,826 B2
(45) Date of Patent: Aug. 23, 2022

(54) METAL OR RUBBER RESONATORS FOR USE IN MONITORING CONVEYOR BELT WEAR AND LONGITUDINAL RIP SENSOR SYSTEMS

(71) Applicant: CONTITECH TRANSPORTBANDSYSTEME GMBH, Hannover (DE)

(72) Inventor: Jack Bruce Wallace, Powell, OH (US)

(73) Assignee: ContiTech Transportbandsysteme GmbH, Hannover (DE)

( * ) Notice: Subject to any disclaimer, the term of this patent is extended or adjusted under 35 U.S.C. 154(b) by 0 days.

(21) Appl. No.: 17/309,441

(22) PCT Filed: Nov. 27, 2019

(86) PCT No.: PCT/EP2019/082710
§ 371 (c)(1),
(2) Date: May 27, 2021

(87) PCT Pub. No.: WO2020/109372
PCT Pub. Date: Jun. 4, 2020

(65) Prior Publication Data
US 2022/0033191 A1 Feb. 3, 2022

Related U.S. Application Data

(60) Provisional application No. 62/772,118, filed on Nov. 28, 2018.

(51) Int. Cl.
*B65G 43/02* (2006.01)
*B65G 43/06* (2006.01)

(52) U.S. Cl.
CPC ...... *B65G 43/02* (2013.01); *B65G 2203/0275* (2013.01); *B65G 2203/046* (2013.01)

(58) Field of Classification Search
CPC ................................ B65G 43/02; B65G 43/06
(Continued)

(56) References Cited

U.S. PATENT DOCUMENTS

| 4,854,446 A | * | 8/1989 | Strader | ................ B65G 43/02 340/676 |
| 6,581,755 B1 | * | 6/2003 | Wilke | ................ B65G 43/02 198/810.04 |

(Continued)

FOREIGN PATENT DOCUMENTS

| CN | 103698059 A | 4/2014 |
| JP | H11208862 A | 8/1999 |
| JP | 2010037096 A | 2/2010 |

OTHER PUBLICATIONS

International Search Report dated Mar. 9, 2020 of PCT application PCT/EP2019/082710 on which this application is based.

*Primary Examiner* — Douglas A Hess
(74) *Attorney, Agent, or Firm* — Gregory Adams; David L. Cate

(57) ABSTRACT

A system for detecting properties of a rubber product is disclosed. The system includes a dipole antenna and circuitry. The dipole antenna is configured to obtain antenna measurements and measure for a resonance frequency of a conductive resonator (200), wherein the dipole antenna (200) is positioned at a first position (A) and a second position (B). The circuitry is configured to determine one or more resonator properties (X) based on the antenna measurements.

20 Claims, 5 Drawing Sheets

(58) Field of Classification Search
USPC .................................................. 198/810.02
See application file for complete search history.

(56) References Cited

U.S. PATENT DOCUMENTS

| | | | | |
|---|---|---|---|---|
| 7,178,663 | B2* | 2/2007 | Schnell | B65G 43/02 |
| | | | | 198/810.02 |
| 7,501,947 | B2* | 3/2009 | Youn | H01Q 1/2225 |
| | | | | 340/572.1 |
| 7,673,739 | B2* | 3/2010 | Freeman | B65G 43/02 |
| | | | | 198/810.01 |
| 8,177,051 | B2* | 5/2012 | Alport | B65G 43/02 |
| | | | | 198/810.02 |
| 8,330,452 | B2* | 12/2012 | Furukawa | B65G 43/04 |
| | | | | 324/228 |
| 8,657,105 | B2* | 2/2014 | Twigger | B65G 43/06 |
| | | | | 198/810.01 |
| 9,988,217 | B2* | 6/2018 | Hou | B65G 43/02 |
| 10,191,001 | B2* | 1/2019 | Kleczewski | G01N 27/228 |
| 10,377,574 | B2* | 8/2019 | Hou | G01B 21/16 |
| 10,829,310 | B2* | 11/2020 | Sakaguchi | G06Q 10/20 |
| 10,845,747 | B2* | 11/2020 | Horie | G03G 15/2017 |
| 2002/0116992 | A1 | 8/2002 | Rickel | |
| 2003/0132893 | A1 | 7/2003 | Forster et al. | |

* cited by examiner

METAL OR RUBBER RESONATORS FOR USE IN MONITORING CONVEYOR BELT WEAR AND LONGITUDINAL RIP SENSOR SYSTEMS

FIELD

The field to which the disclosure generally relates is rubber products exposed to wear conditions, and in particular using conductive resonators coupled with sheath dielectric properties for detection of rubber product wear and/or rip detection. Furthermore, the field to which the disclosure generally relates is to changes in the environment of the resonator caused by a change in dielectric material the resonator is embedded within and hence impacts or shifts the resonator frequency and/or amplitude due to systematic removal of material (wear), gouging event (grooving of material) or cutting event (rip event).

BACKGROUND

Harsh conveyor belt applications are can be difficult and/or challenging for the implementation of embedded sensor applications that require the performance of electronic components for long periods of time, such as 2-20 years and the like. Typical mining events that can occur during the material conveying process can lead to the damage of the embedded electronic circuitry. Long duration applications make it difficult to implement active battery powered sensor applications due to limitations of battery size and active lifespan.

As a result, it is often better to have passive sensor elements embedded in the conveyor belt which can be detected wirelessly through its magnetic, electromagnetic, capacitive and/or resonant properties. However, monitoring these resonators and/or identifying associated wear conditions can be problematic. For example, monitoring or accessing resonators of rubber products may be difficult or not possible for some rubber products.

What is needed are techniques to facilitate accessing or monitoring wear resonators in products such as conveyor belt systems, rubber products and the like.

FIGURES

DETAILED DESCRIPTION

Figure 1A:
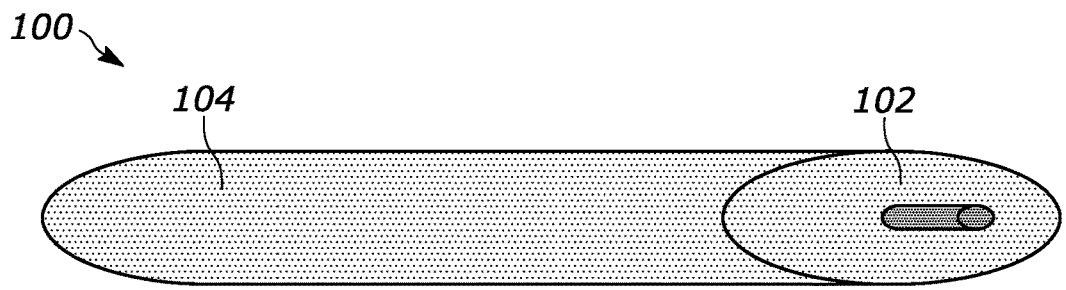
FIGS. 1A, 1B, 1C and 1D illustrate a conductive resonator in accordance with one or more embodiments.

The field to which the disclosure generally relates is rubber products exposed to wear conditions, and in particular using conductive resonators coupled with sheath dielectric properties for detection of rubber product wear and/or rip detection. Furthermore, the field to which the disclosure generally relates is to changes in the environment of the resonator caused by a change in dielectric material the resonator is embedded within and hence impacts or shifts the resonator frequency and/or amplitude due to systematic removal of material (wear), gouging event (grooving of material) or cutting event (rip event).

The following description of the variations is merely illustrative in nature and is in no way intended to limit the scope of the disclosure, its application, or uses. The description is presented herein solely for the purpose of illustrating the various embodiments of the disclosure and should not be construed as a limitation to the scope and applicability of the disclosure. In the summary of the disclosure and this detailed description, each numerical value should be read once as modified by the term "about" (unless already expressly so modified), and then read again as not so modified unless otherwise indicated in context. Also, in the summary of the disclosure and this detailed description, it should be understood that a value range listed or described as being useful, suitable, or the like, is intended that any and every value within the range, including the end points, is to be considered as having been stated. For example, "a range of from 1 to 10" is to be read as indicating each and every possible number along the continuum between about 1 and about 10. Thus, even if specific data points within the range, or even no data points within the range, are explicitly identified or refer to only a few specific, it is to be understood that inventors appreciate and understand that any and all data points within the range are to be considered to have been specified, and that inventors had possession of the entire range and all points within the range.

Unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of concepts according to the disclosure. This description should be read to include one or at least one and the singular also includes the plural unless otherwise stated.

The terminology and phraseology used herein is for descriptive purposes and should not be construed as limiting in scope. Language such as "including," "comprising," "having," "containing," or "involving," and variations thereof, is intended to be broad and encompass the subject matter listed thereafter, equivalents, and additional subject matter not recited.

Also, as used herein any references to "one embodiment" or "an embodiment" means that a particular element, feature, structure, or characteristic described in connection with the embodiment is included in at least one embodiment. The appearances of the phrase "in one embodiment" in various places in the specification are not necessarily referring to the same embodiment.

Some embodiments according to the disclosure include one or more sheathed conductive resonators embedded into a rubber product, and an active antenna to detect dielectric properties of the conductive resonator. In one aspect this could be a dipole antenna. An electronic circuit may be used, that would use the active antenna to measure the changes in the resonators' properties as a function of resonance frequency shift, full width ½ max profile changes, amplitude changes and/or similar electrical characteristic change. Furthermore, equipment may be used for outputting a report, analog or digital signal, and/or an alarm based on measured results In some other embodiments of the disclosure, one or more sheathed conductive resonator are embedded into a rubber product, and an embedded circuit directly connected with the conductive resonator (hard wired or inductively coupled) detects dielectric properties of the conductive resonator via designed function, function of resonance frequency shift, full width ½ max profile changes, amplitude changes and/or similar electrical characteristic change. A system for outputting data via RFID reader may also be used. In some aspects, the conductive resonator element is an antenna and/or an active sensing element associated with RFID tag Some embodiments according to the disclosure include using a conductive resonator contained within a sheath having dielectric properties, where the sheathed conductive resonator is embedded in a rubber product and is used to detect wear by measuring degradation of an insulating rubber layer, of know properties, that sheaths the conductive resonator. One non-limiting example of such is provided in FIGS. 1A and 1B.

Figure 1B:
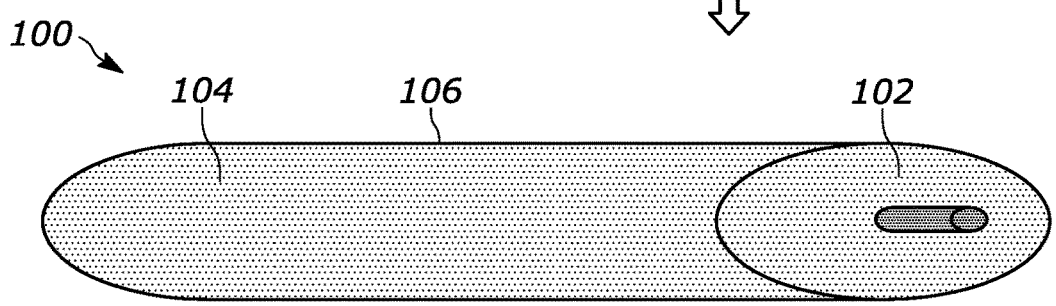

FIGS. 1A and 1B illustrate a conductive resonator 100 in accordance with one or more embodiments. The resonator 100 is provided for illustrative purposes and it is appreciated that suitable variations are contemplated.

The resonator, where conductive resonator 102 is sheathed in insulating rubber layer 104, of sheathed conductive resonator 100. In use, over time and/or temperature and/or abrasive conditions, the rubber product containing sheathed conductive resonator 100 may eventually wear, which ultimately would form a wear zone 106 in insulating rubber layer 104 having known dielectric properties.

Such is shown in the FIG. 1A to FIG. 1B transition and shape change of insulating rubber layer 104. Accordingly, as a result of the wear induced shape change of insulating rubber layer 104, dielectric property properties of the sheathed conductive resonator 100 would correspondingly change, as the insulating rubber layer 104 electrical conductance and conductive resonator 102 electrical permittivity would change. The net result would be a shift in the measurable resonance frequency of sheathed conductive resonator 100.

Figure 1C:
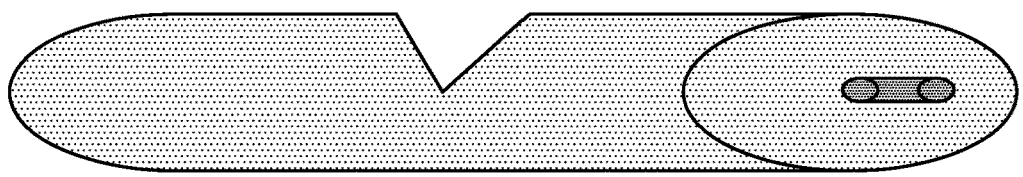

FIG. 1C is a diagram illustrating the conductive resonator 100 in accordance with one or more embodiments. In this example, a groove is shown formed in an upper portion of the insulating rubber layer 104. The groove is a result of wear that causes changes in the dielectric properties. As a result, the groove produces a shift or change in the measurable resonance frequency of the resonator 100.

Figure 1D:
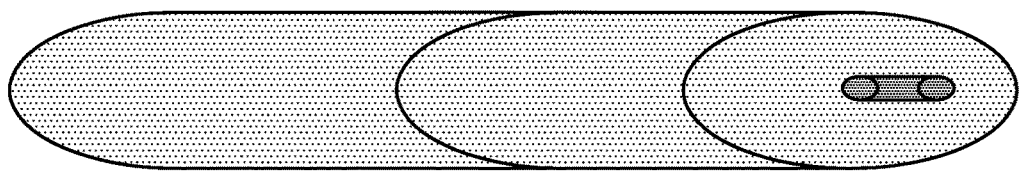

FIG. 1D is another diagram illustrating the conductive resonator 100 in accordance with one or more embodiments. In this example, sufficient wear has occurred to rip or separate the conductive resonator. As a result, the rip causes a substantial change in the measurable resonance frequency of the resonator 100.

Figure 2:
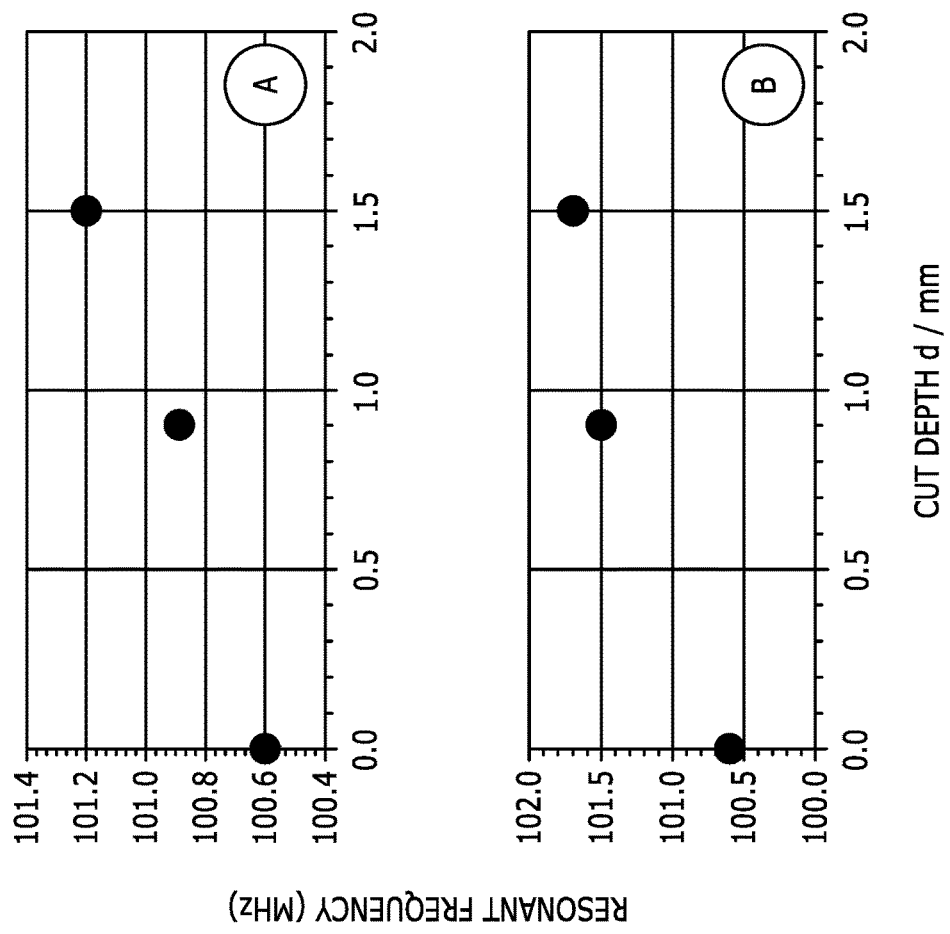
FIG. 2 is a diagram illustrating a rubber product containing sheathed conductive resonator within a wear detection system in accordance with one or more embodiments.
Figure 2:
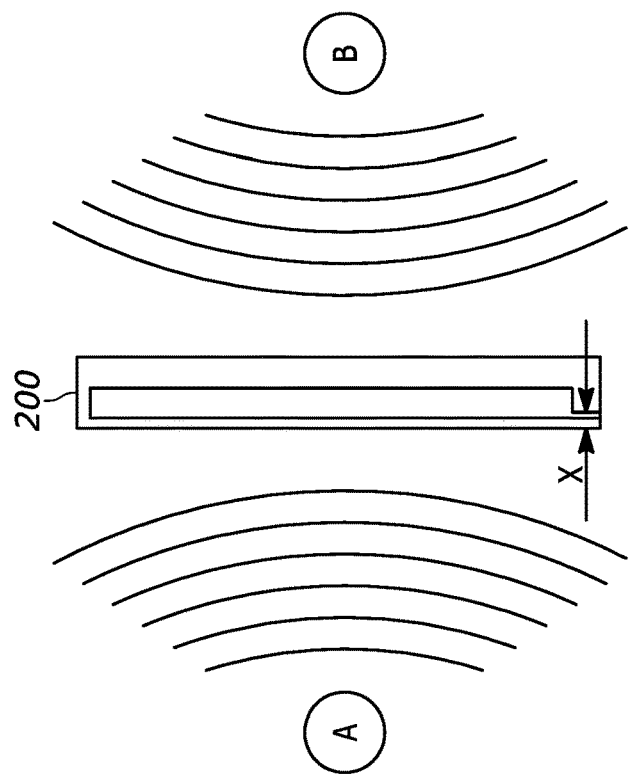

FIG. 2 is a diagram illustrating a rubber product containing sheathed conductive resonator 200 within a wear detection system in accordance with one or more embodiments.

In this embodiment/aspect, as represented in FIG. 2, a rubber product containing sheathed conductive resonator 200 (which may be like or similar to that described in FIG. 1) may be monitored and measured for resonant frequency with a dipole antenna alternatively positioned at A and B, for such properties as temperature, aging, damage, and/or wear. For example, as wear cut depth increases at position X of sheathed conductive resonator 200, a change in the resonant frequency occurs, which is represented in the graphs. As the sheathed conductive resonator 200 wears, the resonant frequency will tend to increase. Such an arrangement also makes possible not having to incorporate conventional electronic monitoring components into the rubber product.

The wear detection system operates on or with the resonator 200. The wear detection system can detect one or more properties of a rubber product and monitor wear of the product. The wear detection system includes an active antenna, wear detection circuitry and report generating circuitry.

The aspects described above may be useful to provide value added process information for rubber products that do not currently monitor wear of their products during operation, but instead at regular intervals. In some cases, the wear of the rubber products that embodiments of the disclosure intend to be implemented within, may not be accessible to be measured while in operation, or may be difficult to access for direct measurements, even when product is not in service.

Embodiments according to the disclosure may be used in any of many rubber products where product wear is an issue and difficult to measure. For example, molded product applications like ball mill or chute liners where wear state is used to determine when a part should be replaced, tractor tire tread or track wear monitoring, internal hose wear measurement where layers cannot be accessed, and similarly, pipe liner wear in abrasive applications. Further, in some aspects, the resonator properties cannot always be directly measured, and as a result, may be passed through an embedded circuit and communicated out of the product with associated RFID based technology for identification of the resonator.

In some aspects of the disclosure, metal conductive core resonators are embedded in the sheathed conductive resonator, which may provide better conductive properties for optimum detection, and conductive rubber-based solutions may be used for the sheath, which may have better durability due to elongation properties, in comparison with the metal conductor solutions. Accordingly, the sheathed conductive resonator has the ability to elongate with the deformation of the rubber product, and can continue to function, unlike conventional metal conductor designs. This may provide higher longevity of the sheathed conductive resonator when used in harsh applications. Alternatively, sheathed conductive resonator products may be tied to an embedded circuit and RFID reader to transmit data out of the product while the product is in use. In yet other applications, antenna devices may be used to measure embedded sheathe conductive resonator properties.

In some applications, the sheathed conductive resonators could be embedded at regular frequencies in conveyor belt, agricultural track, and the like, and measured with a dipole antenna mounted in close proximity to the embedded sheathe conductive resonator in the rubber product.

In some aspects, rip detection may be accomplished measuring by the loss of a resonance frequency of an antenna or antennas of given lengths, which are embedded in the rubber product. For example, a conveyor belt may, in one case, have one or more sheathed conductive resonator(s), each disposed across the width of the conveyor belt, where each acts an antenna, and where change in resonant frequency at a particular bandwidth indicates a rip in the conveyor belt. In another case, a conveyor belt may, have one or more groupings of sheathed conductive resonator(s), each grouping disposed across the width of the conveyor belt, where each grouping acts an antenna, and where change and/or shift in resonant frequency at a particular bandwidth indicates a rip in the conveyor belt. Such examplary options are depicted in FIG. 3.

It is appreciated that a shift in resonant frequency indicates wear and a dramatic shift in resonant frequency indicates a rip. In one example, a resonance change within a predetermined range is wear whereas a resonance change outside that range indicates a rip or tear. In another example, a frequency resonance change that is a multiple of two or more from the predetermined range indicates a rip or tear.

Figure 3:
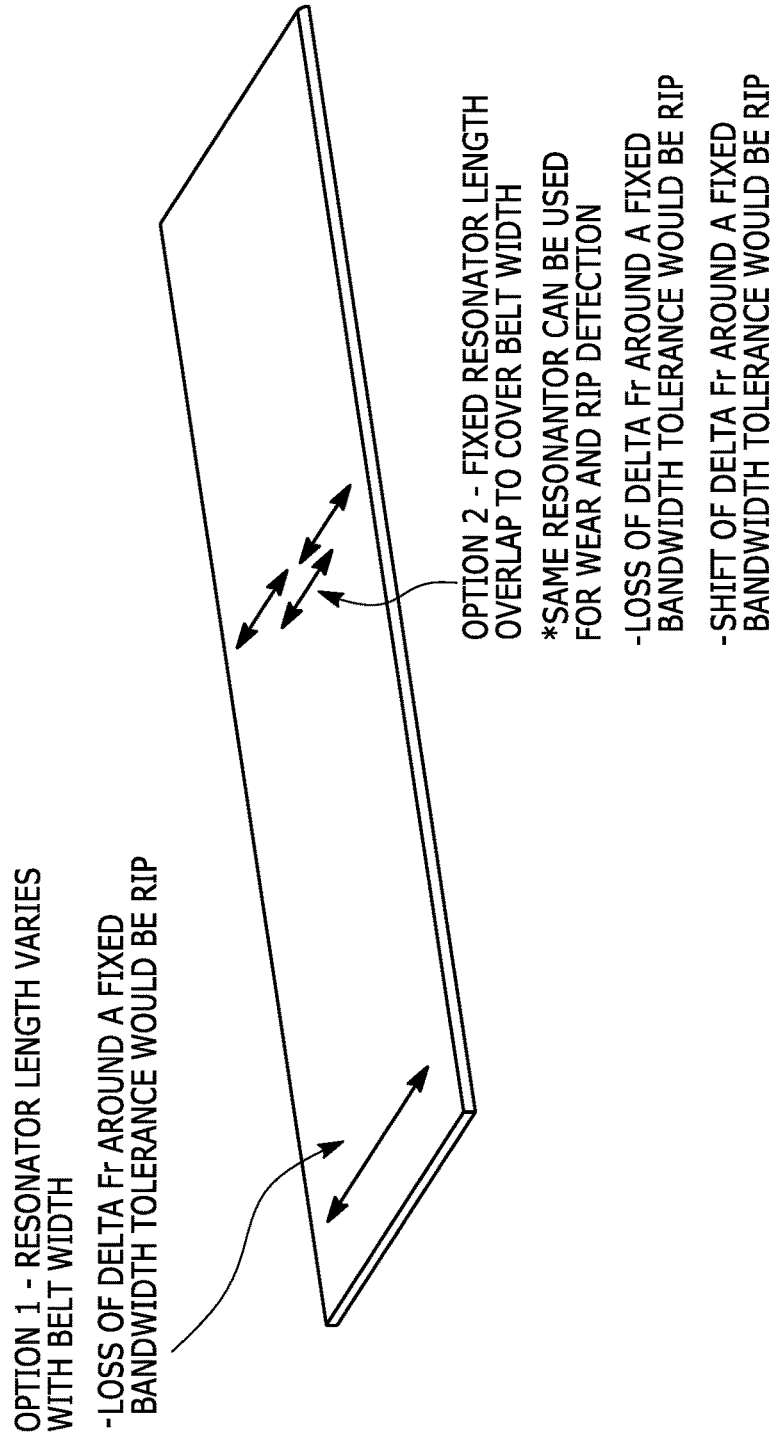
FIG. 3 is a diagram illustrating various options for a conductive resonator and detection system in accordance with one or more embodiments.

In Option 1 of FIG. 3, a rip could actually generate a significant shift of the resonance frequency and most likely generate two separate resonators at different frequencies. Thus, if the resonators were for a given belt width, the resonators detection system would search for a resonance frequency within a certain range, at a specific position interval along the length of the belt. Similar to current inducive system, however, when damaged, the resonator actually becomes two shorter antennas with significantly different resonance properties. In this case, the system could be adjusted for each belt width as the different lengths would lead to a different resonance frequency. This could also have the advantage of antenna placement in the belt to have a fixed sensing coil position on both sides of the belt.

In the second example, Option 2 of FIG. 3 above, a series of dipole sensing coils could be positioned across the belt to detect both for rip and wear of the embedded sensors, and the sensors in the case would be fixed in width and overlapped across the belt to ensure full width coverage. In this case, the system can be designed for a fixed resonance frequency for all belt widths and the number of sensing coils may be adjusted to cover the full belt width. This could provide advantages in terms of the information from the sensors which could allow for more location specifics as the sensors are segmented, as well as determining a wear point or a damage point within a given antenna segment.

In addition to the foregoing, the disclosures made in U.S. Pat. Nos. 6,715,602, 7,740,128 and 9,452,892 are incorporated herein in their entirety, by reference thereto.

In another example for FIG. 3, a plurality of conductive resonators are arranged across a belt width along with a plurality of associated antenna. Changes in resonance frequencies and the like can be detected for one or more of the plurality of conductive resonators.

Figure 4:
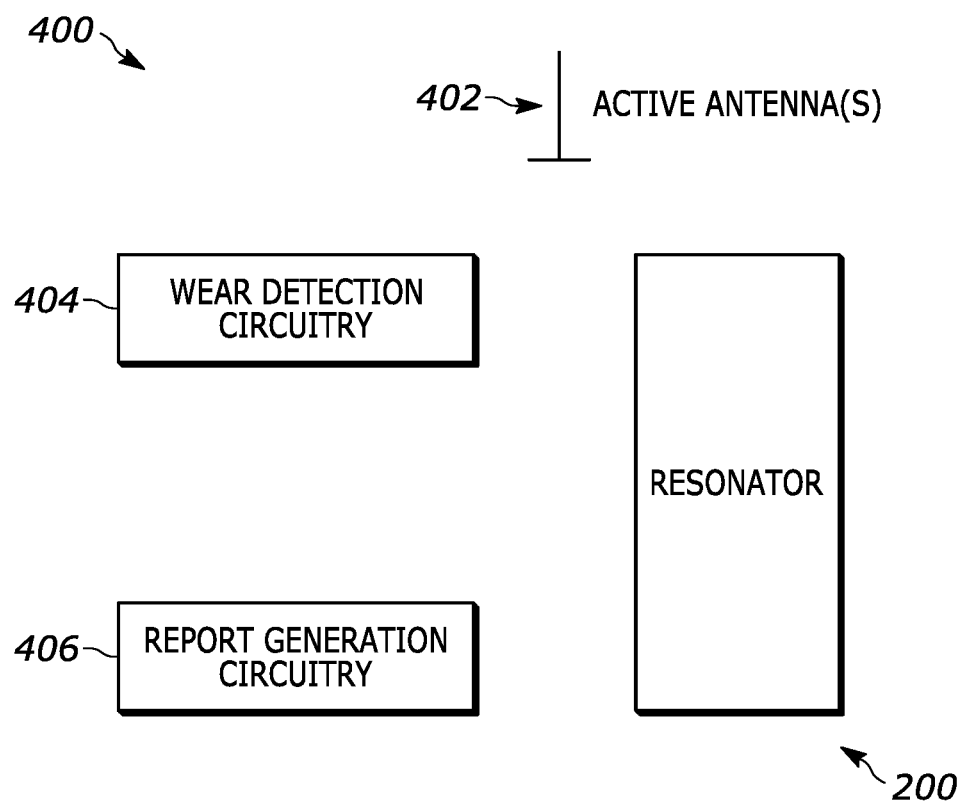
FIG. 4 is a diagram illustrating a wear detection system in accordance with one or more embodiments.

FIG. 4 is a diagram illustrating a wear detection system 400 in accordance with one or more embodiments. The system 400 is provided for illustrative purposes and it is appreciated that suitable variations are contemplated.

The system 400 can be used with and/or in conjunction with the above embodiments, examples, aspects, options and/or the like shown in FIGS. 1-3. The system 400 can be implemented as an arrangement and/or apparatus.

The system 400 includes an active antenna 402, wear detection circuitry 404, report generation circuitry 406 and operates on one or more conductive resonators, such as the conductive resonator 200. The one or more conductive resonators are associated with or formed within a product, such as a conveyor belt, tire tread, and the like as shown above. The one or more conductive resonators can be utilized with RFID and the like.

The active antenna 402 can be a dipole antenna. Additionally, the active antenna can include a plurality of antennas. The active antenna is configured to obtain antenna measurements and measure for a resonance frequency of a conductive resonator.

The wear detection circuitry 404 utilizes measurements from the active antenna to measure resonance properties and changes in resonance of the conductive resonator. The wear detection circuitry 404 is configured to measure changes in the one or more resonators (properties) as a function of resonance frequency, resonance shift, full width, ¼ max profile changes, amplitude changes, electrical characteristic changes and the like.

The wear detection circuitry 404 is further configured to determine and/or detect wear, rips, and the like of the associated product.

The report generation circuitry 406 is configured to generate reports, analog signals, digital signals, alarms, measured results, and the like based on the measurements from the active antenna and changes/information determined by the wear detection circuitry 404. In one example, the circuitry 406 includes a transceiver and/or the like to wirelessly provide the above generated information.

It is appreciated that some or all of the system 400 can be implemented within the associated product. For example, the circuitry 404 and 406 can be located within a product and provide information to devices external to the product.

It is appreciated that suitable variations of the system 400 are contemplated.

Figure 5:
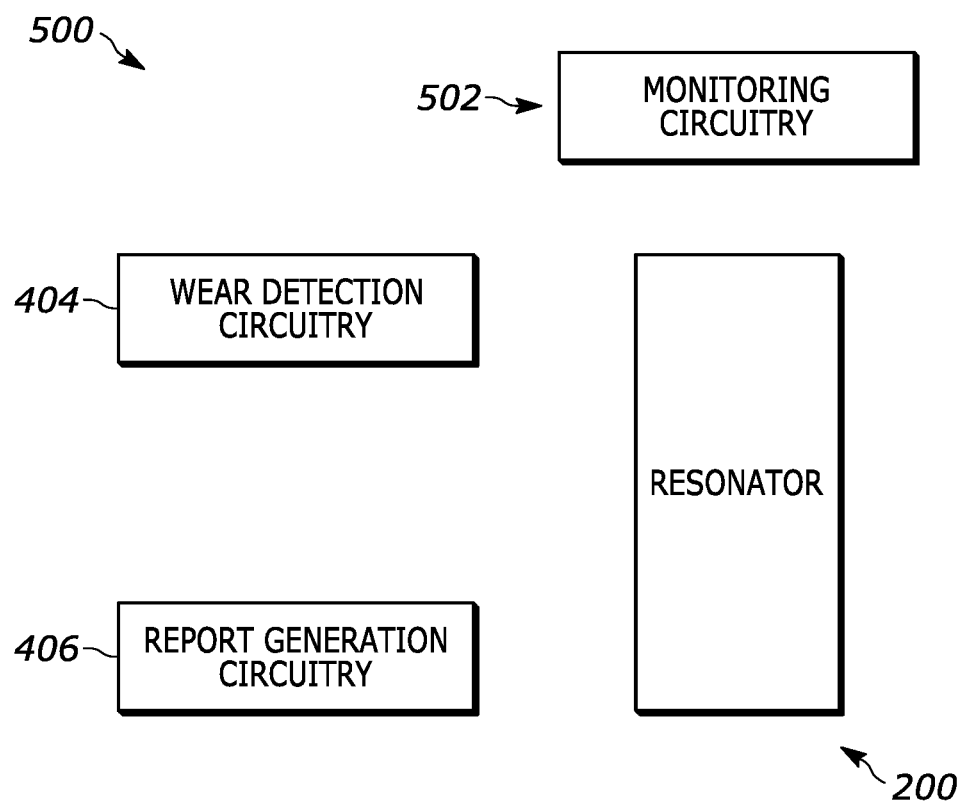
FIG. 5 is a diagram illustrating a wear detection system in accordance with one or more embodiments.

FIG. 5 is a diagram illustrating a wear detection system 500 in accordance with one or more embodiments. The system 500 is provided for illustrative purposes and it is appreciated that suitable variations are contemplated. The system 500 can be implemented as an arrangement and/or apparatus.

The system 500 includes a monitoring circuitry 502, wear detection circuitry 404 and report generation circuitry 406. The system 500 operations on or in conjunction with one or more conductive resonators, such as the resonator 200.

The system 500 is similar to the system 400, which can be referenced for additional understanding.

The monitoring circuitry 502 can be embedded within a rubber product along with the one or more conductive resonators.

The monitoring circuitry 502 is connected to the one or more conductive resonators by a suitable technique. The connection can be by direct/hard wiring to the one or more resonators, by induction, and the like.

The monitoring circuitry 502 can be configured to detect dielectric properties of the one or more resonators. Further, the circuitry 502 can be configured to detect properties of the one or more resonators by a designed function, as a function of resonance frequency, frequency shift, and the like.

The monitoring circuitry 502 can implement some of the functionality of the wear detection circuitry 404.

The monitoring circuit 502 is configured to transfer detected information, measurements, and the like to the wear detection circuitry 404 and/or the report generation circuitry 406. The information from the monitoring circuitry 502 can be provided wirelessly, such as by a transceiver, radio frequency identification (RFID) and the like. The circuitry 404 and 406 can also include a transceiver to receive the monitored information.

It is appreciated that suitable variations of the system 500 are contemplated.

One general aspect includes a system for detecting one or more properties of a rubber product. The system also includes an antenna configured to obtain antenna measurements of an embedded conductive resonator, where the dipole antenna is and positioned in one or more positions proximate to the embedded conductive resonator. The system also includes circuitry configured to determine one or more resonator properties based on the antenna measurements, where the one or more resonator properties include a change in resonance frequency. Other embodiments of this aspect include corresponding computer systems, apparatus, and computer programs recorded on one or more computer storage devices, each configured to perform the actions of the methods.

Implementations may include one or more of the following features. The system where the one or more resonator properties include dielectric characteristics and an increase in the resonance frequency. The conductive resonator is substantially straight across a lateral direction of a belt. The conductive resonator has a sinusoidal shape or a spring shape that facilitate extension and/or compression of the conductive resonator. The conductive resonator may include a non-conductive sheath surrounding a conductive element. The conductive element may include a carbon nano-tube conductive element. The conductive resonator is associated with a rubber product and the circuitry is configured to determine wear of the rubber product based on the measured resonance frequency of the conductive resonator. The rubber product is one of a group subject to wear, such as those may include a chute liner, a skirt board, a scraper, a plow, a rubber lagging and a tire tread. The antenna is a dipole antenna. The circuitry is configured to determine characteristics of the rubber product based on the determined one or more resonator properties, prior resonance information, resonator position and resonator identification information. The determined characteristics of the rubber product may include one or more of temperature, compound aging, damage, wear and rip. The prior resonance information may include previous antenna measurements for the conductive resonator. The prior resonance information may include previous determined characteristics of the rubber product. The resonator identification information includes a location on a belt and an assigned property to monitor. The conductive resonator has a length based on a belt width and a loss of delta Fr at a fixed bandwidth indicates a rip in a conveyor belt. The conductive resonator may include a plurality of fixed length resonators having an overlap and cover a belt width, where the plurality of fixed length resonators facilitate wear detection and rip detection based on a loss of delta Fr at a fixed bandwidth and/or a shift of delta Fr at the fixed bandwidth. Implementations of the described techniques may include hardware, a method or process, or computer software on a computer-accessible medium.

One general aspect includes a system utilizing a conductive core to determine wear. The system also includes a product having one or more rubber containing product layers. The system also includes a rubber conductive core proximate to the one or more product layers. The system also includes a wear monitoring arrangement having an active antenna and configured to measure a resonance frequency of the rubber conductive core and to determine parameters of the product based on the measured frequency. Other embodiments of this aspect include corresponding computer systems, apparatus, and computer programs recorded on one or more computer storage devices, each configured to perform the actions of the methods.

Implementations may include one or more of the following features. The system where the product includes an embedded circuit to transmit data during use of the product, where the transmitted data includes wear information. The product includes radio-frequency identification (RFID) circuitry to generate electromagnetic fields to transmit data, where the transmitted data includes wear information. The product is a conveyor belt. The product may include a plurality of conductive resonators disposed at regular locations and coupled to the wear monitoring arrangement and where the plurality of conductive resonators are arranged across a belt width of the product and the arrangement includes overlapping regions. The active antenna is a dipole antenna. Implementations of the described techniques may include hardware, a method or process, or computer software on a computer-accessible medium.

One general aspect includes a method of detecting properties of a rubber product. The method of detecting properties also includes measuring a dipole field proximate to a conductive resonator by an antenna to obtain antenna measurements. The properties also includes determining a resonance frequency based on the antenna measurements. The properties also includes determining the one or more properties based on the resonance frequency and one or more previous resonance frequencies associated with the rubber product and the conductive resonator. Other embodiments of this aspect include corresponding computer systems, apparatus, and computer programs recorded on one or more computer storage devices, each configured to perform the actions of the methods.

Implementations may include one or more of the following features. The method where the one or more properties include wear and rip. Determining the one or more properties is further based on location information of the conductive resonator within the rubber product and the location information is received by way of a radio frequency identification (rfid) circuitry located within the rubber product. Implementations of the described techniques may include hardware, a method or process, or computer software on a computer-accessible medium.

The foregoing description of the embodiments has been provided for purposes of illustration and description. Example embodiments are provided so that this disclosure will be sufficiently thorough, and will convey the scope to those who are skilled in the art. Numerous specific details are set forth such as examples of specific components, devices, and methods, to provide a thorough understanding of embodiments of the disclosure, but are not intended to be exhaustive or to limit the disclosure. It will be appreciated that it is within the scope of the disclosure that individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Also, in some example embodiments, well-known processes, well-known device structures, and well-known technologies are not described in detail. Further, it will be readily apparent to those of skill in the art that in the design, manufacture, and operation of apparatus to achieve that described in the disclosure, variations in apparatus design, construction, condition, erosion of components, gaps between components may present, for example.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner", "adjacent", "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

Although a few embodiments of the disclosure have been described in detail above, those of ordinary skill in the art will readily appreciate that many modifications are possible without materially departing from the teachings of this disclosure. Accordingly, such modifications are intended to be included within the scope of this disclosure as defined in the claims.

What is claimed is:

1. A system for detecting one or more properties, the system comprising:
    a rubber product;
    an embedded conductive resonator embedded in the rubber product, the resonator having a sheathing where dielectric properties of the resonator are based on wear of the sheathing and a resonance frequency of the resonator is based on the dielectric properties;
    an antenna configured to obtain antenna measurements of the embedded conductive resonator, the antenna is positioned in one or more positions proximate to the embedded conductive resonator; and
    circuitry configured to determine one or more resonator properties based on the antenna measurements, wherein the one or more resonator properties include a change in resonance frequency.

2. The system of claim 1, wherein the circuitry is configured to determine characteristics of the rubber product based on the determined one or more resonator properties, prior resonance information, resonator position and resonator identification information.

3. The system of claim 2, wherein the determined characteristics of the rubber product comprise one or more of temperature, compound aging, damage, wear and rip.

4. The system of claim 2, wherein the prior resonance information comprises previous antenna measurements for the conductive resonator and previous determined characteristics of the rubber product.

5. The system of claim 2, wherein the resonator identification information includes a location on a belt and an assigned property to monitor.

6. The system of claim 1, wherein the conductive resonator is substantially straight across a lateral direction of a belt.

7. The system of claim 1, wherein the conductive resonator has a sinusoidal shape or a spring shape that facilitate extension and/or compression of the conductive resonator.

8. The system of claim 1, wherein the conductive resonator is configured to elongate with the rubber product.

9. The system of claim 8, wherein the conductive element comprises a carbon nano-tube conductive element.

10. The system of claim 1, wherein the rubber product is one of a group subject to wear, such as those comprising a chute liner, a skirt board, a scraper, a plow, a rubber lagging and a tire tread.

11. The system of claim 1, wherein the antenna is a dipole antenna.

12. The system of claim 1, wherein the conductive resonator has a length based on a belt width and a loss of delta Fr at a fixed bandwidth indicates a rip in a conveyor belt.

13. The system of claim 1, wherein the conductive resonator comprises a plurality of fixed length resonators having an overlap and cover a belt width, wherein the plurality of fixed length resonators facilitate wear detection and rip detection based on a loss of delta Fr at a fixed bandwidth and/or a shift of delta Fr at the fixed bandwidth.

14. The system of claim 1, wherein the rubber product includes an embedded circuit to transmit data during use of the product, wherein the transmitted data includes wear information.

15. The system of claim 14, wherein the rubber product includes radio-frequency identification (RFID) circuitry to generate electromagnetic fields to transmit data, wherein the transmitted data includes wear information.

16. The system of claim 1, wherein the rubber product comprises a plurality of conductive resonators disposed at regular locations and coupled to the wear monitoring arrangement and wherein the plurality of conductive resonators are arranged across a belt width of the product and the arrangement includes overlapping regions, the plurality of conductive resonators including the embedded conductive resonator.

17. The system of claim 1, the circuitry further configured to measure a dipole field proximate the resonator, determine a resonance frequency based on the measurements, and determine one or more properties based on the resonance frequency and one or more previous resonance frequencies associated with the rubber product and the conductive resonator.

18. The system of claim 17, the one or more properties include wear and rip.

19. The system of claim 18, the determined one or more properties is further based on location information of the conductive resonator within the rubber product and the location information is received by way of a radio frequency identification (RFID) circuitry located within the rubber product.

20. The system of claim 1, the rubber product is an elastomeric conveyor belt.

* * * * *